Dec. 31, 1929.　　　K. E. LYMAN　　　1,741,863
AUTOMATIC TRANSMISSION
Original Filed Aug. 4, 1928　　3 Sheets-Sheet 1
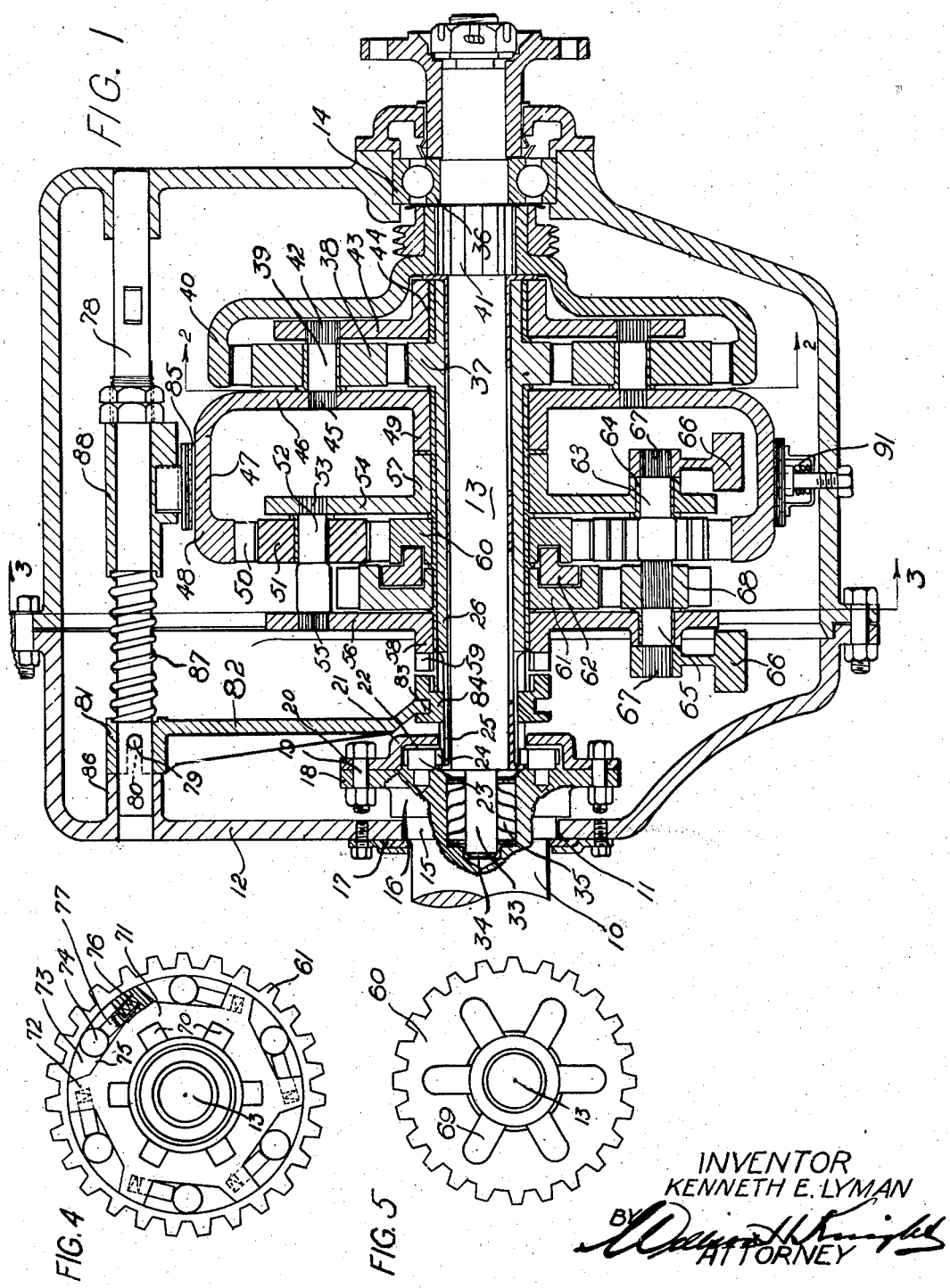
INVENTOR
KENNETH E. LYMAN
BY
ATTORNEY Dec. 31, 1929.  K. E. LYMAN  1,741,863

AUTOMATIC TRANSMISSION

Original Filed Aug. 4, 1928   3 Sheets-Sheet 2

INVENTOR.
KENNETH E. LYMAN
BY
ATTORNEY

Dec. 31, 1929.　　　　K. E. LYMAN　　　　1,741,863
AUTOMATIC TRANSMISSION
Original Filed Aug. 4, 1928　　3 Sheets-Sheet 3
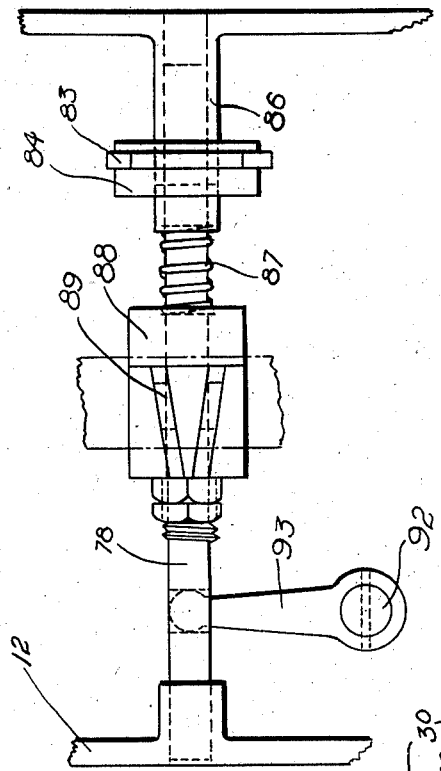
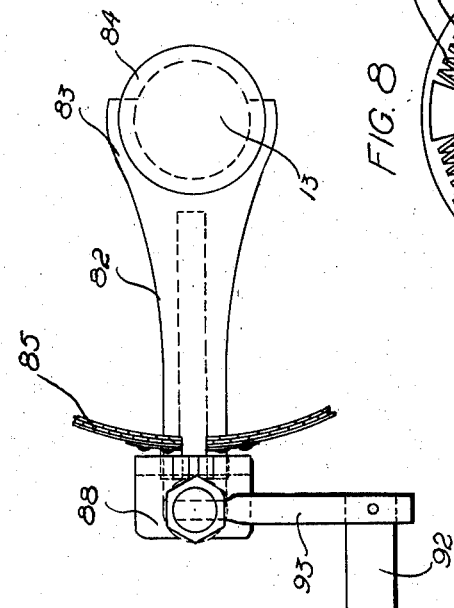
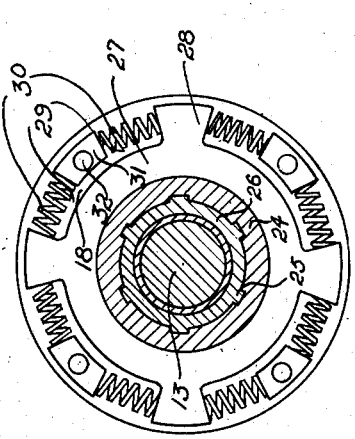
INVENTOR.
KENNETH E. LYMAN
BY
ATTORNEY Patented Dec. 31, 1929

1,741,863

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed August 4, 1928, Serial No. 297,518. Renewed November 18, 1929.

The present invention relates in general to power transmitting mechanisms and has particular reference to an improved automatic transmission, which is especially adaptable for use in connection with motor driven vehicles.

The principle objection of the invention resides in the provision of a mechanism of the character described which is capable of establishing a gradual speed ratio variation, from zero to maximum, and controlled automatically by a variable condition existing in the mechanism.

While the foregoing explains briefly the nature of the invention other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings:

Figure 1 is a view in horizontal section of the transmission.

Figure 4 is a view in side elevation of one part of the over-running clutch used in the transmission.

Figure 5 is a similar view of a cooperating part of the over-running clutch.

Figure 6 is a detailed view in side elevation of the manually operated brake controlling mechanism employed for reversing purposes.

Figures 7 is a bottom plan view of the same mechanism and,

Figure 8 is a detailed view in side elevation of the flexible connection by means of which the driving shaft is connected to the transmission.

Figure 3:
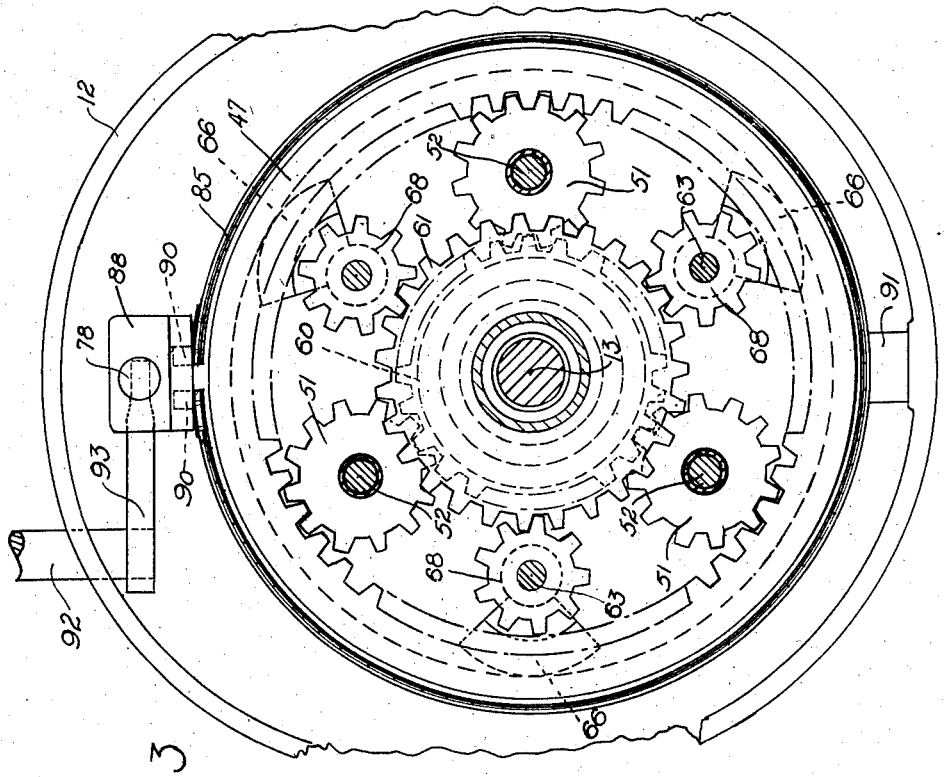
Figure 3 is a vertical section on the line 3—3 Figure 1.
Figure 2:
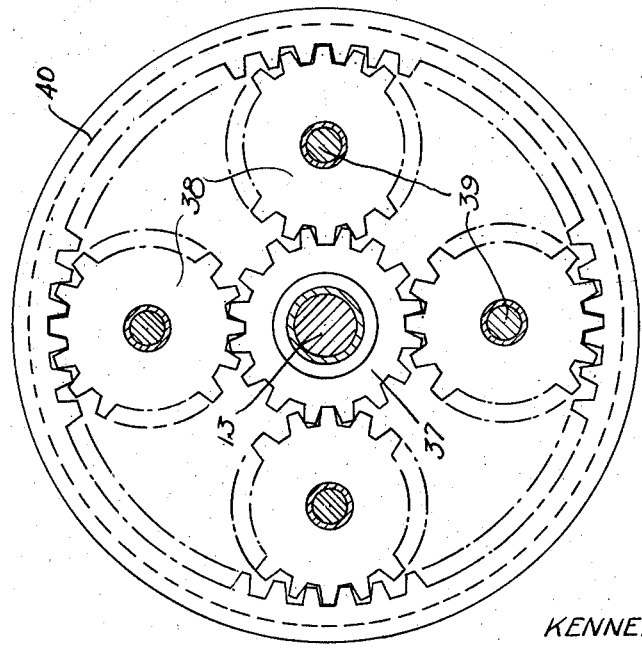
Figure 2 is a vertical section on the line 2—2 Figure 1.

Before referring to the drawings in detail, it will be first mentioned that one of the outstanding characteristic features of the present combination is to realize an unusually effective speed responsive means such as centrifugal weights for controlling the planetating movement in the planetary gear system and to realize this objective with a reduction in inertia forces. With this end in view, the mechanism embodies an assembly comprising driving shaft 10 which extends through an opening as at 11 in one side of a housing 12 with the driven shaft 13 extending through an opening as at 14 in the opposite side of the housing. The driving shaft is preferably made with at least two stepped diameters 15 and 16, the smaller of which providing a bearing surface in the opening 11 and cooperating with the closure 17 for preventing escape of lubricating fluid from the housing. The larger diameter 16 terminates with a radial flange 18 to which is mounted by bolts or the like 19, a ring plate 20 which is made with an offset part 21 to provide a recess as at 22 for accommodating a flexible connection 23.

As best illustrated in Figure 8, the flexible connection preferably comprises a sleeve or the like 24 which is keyed or otherwise fixed on the splined area 25 or the relatively long sleeve 26. The radial extension of the sleeve on the flexible connection includes a ring member 27 having radial projections 28, providing an annular series of spaced recesses 29 each of which accommodate a pair of springs 30, the ends of which are abutting against the radial projections at one end with their opposite ends resting against blocks 31 which are fixed to the radial flange 18 by pins or the like 32.

The driving shaft 13 extends through the housing 12 and with its reduced end 33 accommodated within an axial bore 34 in the end of the driving shaft 10 with a roller bearing or the like 35 supporting the inserted end as best illustrated in Figure 1. It will thus be seen that the driving shaft supports the driven shaft at one end with the opposite end of the driven shaft supported in the opening 14 in the other side of the housing 12 by means of a cooperating ball-bearing 36.

The relatively long sleeve 26 is mounted with freedom of rotation on the driven shaft 13 and carries adjacent its rear end, preferably as an integral part thereof, a sun gear 37. This sun gear 37 is mounted for constant mesh with a plurality of planet gears 38 which are journaled with freedom of rotation on planet shafts 39. The planet gears are also in constant mesh with a ring gear 40 which is keyed or otherwise mounted in fixed relation to an enlarged diameter 41 on the driven shaft. The planet shafts 39 are keyed or otherwise fixed as at 42 to a carrier 43 which has a sleeve 44 mounted with freedom of rotation relatively to the rear extension on the sun gear sleeve 26.

The opposite ends of the planet shaft are likewise fixed as at 45 to the side 46 of a combined ring gear and carrier 47. As a matter of fact, this combined ring gear and carrier also serve as a brake wheel since it is made with a braking surface 48 around its outer circumference, the purpose of which will be hereinafter described. The sun gear 37, the planet gears 38 and the ring gear 40 serve as a primary planetating system and the same will be now so designated.

For convenience in further referring to the combined ring gear and carrier 47, the same will be referred to generally as a secondary ring gear. In this connection it is made with a relatively short sleeve 49, which is mounted on and with freedom of rotation relatively to the sleeve 26 of the primary sun gear 37. The teeth 50 of this secondary ring gear are in constant mesh with a plurality of secondary planet gears 51 which are journaled on and with freedom of rotation relatively to a plurality of secondary planet shafts 52. These planet shafts are keyed or otherwise fixed as at 53 to a carrier 54 on one side of the planet gears 51 and their opposite ends are likewise fixed as at 55 in a carrier 56 on the opposite side of the planet gears 51. The sleeve 57 of the carrier 54 is rotatably mounted on the relatively long sleeve 26 and the sleeve 58 of the carrier 56 is also rotatably mounted on the sleeve 26. The sleeve 58 serves as a clutch ring having teeth 59 for this purpose.

Arranged in constant mesh with the secondary planet gears 51 is a secondary sun gear 60, the same being mounted on and with freedom of rotation relatively to the sun gear sleeve 26 and connected in cooperative relationship with a supplemental sun gear 61 by means of a one-way clutch 62.

Also assembled in the secondary planetating system are a plurality of supplemental planet shafts 63. These shafts are long enough to be journaled as at 64 and 65 in the carriers 54 and 56 and with their ends projecting outwardly for accommodating a series of two sets of centrifugal weights 66. The weights are keyed or otherwise fixed as at 67 to the ends of the shafts 63 so as to rotate with the shafts. It will thus be seen that the secondary planetating system is equipped with a set of these centrifugal weights on opposite sides of the secondary sun gear 60 as well as the supplemental sun gear 61.

Keyed or otherwise fixed on the supplemental planet shafts 63 are a plurality of supplemental planet gears 68 which are in constant mesh with the supplemental sun gear 61.

As best illustrated in Figures 4 and 5, the one-way clutch mechanism preferably comprises a series of radial slots, recesses or the like 69 in the secondary sun gear 60, which are made to receive the lugs or projections 70 on the spider like plate 71 carried by the supplemental sun gear 61. This spider plate 71 is made with spaced projections 72 which provide a plurality of spaces 73 in which are confined clutch rollers 74. The inclined surfaces 75 on the spider plate 71 provide wedging surfaces for the spaces 73 so that the roller 74 when urged in one direction will wedge in the spaces and lock the spider plate 71 to the supplemental sun gear 61. The clutch rollers in this respect are normally thrust outwardly under the influence of the coil springs 76 operating against the plungers 77. With this construction rotation of the supplemental sun gear 61 in one direction will release the roller clutches 74 so that the supplemental sun gear may rotate in advance of the secondary sun gear 60 but will be held against retrograde movement relatively to the secondary sun gear so that it must rotate with the latter in another direction. The purpose of this over-running clutch is to prevent the accelerating forces developed in the secondary planetating system from delivering an accelerating effect to the planetating movement in the primary system.

In other words, the centrifugal weights 66 are employed for automatically controlling the planetating movement in the primary system and this control is effected by relying on the weights to produce a retarding force in the planetating movement of the primary system so that the ring gear 40 may be picked up at certain speeds of the driving shaft for rotating the driven shaft. It might be mentioned here that the drive coming into the transmission at very low speeds, that is to say, at a speed too low to make the centrifugal force of the weights effective, the ring gear 40 of the primary system will remain stationary due to its positive connection with the driven shaft. But just as soon as the speed of the driving shaft increases to an extent that the weights 66 will respond to the speed thereof, the ring gear 40 will be gradually picked up and as the speed of the driving shaft increases with the resultant increase in the effectiveness of the weights, the ring gear will be caused to rotate faster until the tooth pressure becomes severe enough as a result of the increased effectiveness of the weights to arrest the planetating movement and automatically establish a one to one drive through the mechanism. The particular arrangement of the secondary planetating system and the cooperation of the supplemental system, so to speak, is very desirable for realizing a very effective retarding effect in the planetating movement in the planetating system without an undesirable high speed for the weights. In other words, the weights may be operated at a comparatively low speed and still be entirely effective. This is a very desirable condition since it gives the one-way clutch mechanism sufficient time to properly function even at comparatively high speeds. This condition is realized and may be more clearly understood by further explanation as follows.

With the primary ring gear stationary, as it will be until the weights become effective, the primary carrier 43 is revolved slowly forward and the secondary ring gear 47 travels therewith. However, the secondary carrier and primary sun gear are rotating at the same speed and consequently the planetating movement of the gears carrying the weights is reduced so that the same centrifugal effects are experienced with less inertia effects. This gives the over-running clutch sufficient time to properly function.

The mechanism, as illustrated in Figure 1, is shown in neutral. If it were desired to go into forward speeds, the manually shiftable shaft 78 will be moved to the right, viewed from Figure 1 and the pin 79 on the shaft seated in the notch 80 of the collar 81 would move the arm 82 to the right. The arm 82 is made with a yoke 83 which engages in an annular recess in the circumference of the clutching dog 84. The clutching dog 84 is mounted to slide on the splined area 25 of the primary sun gear sleeve 26. It is thus mounted to slide on the sleeve but restrained against rotation thereon. In other words it has to rotate with the sleeve and the sleeve, as previously stated, is fixed to rotate with the driving shaft. By thus sliding the clutching dog 84 to the right, viewed from Figure 1, it will be engaged by the clutching teeth 59 on the carrier 56, thus connecting the carrier 56 in driving relation with the driving shaft. The shifting of the shaft 74 to effect this connection will also release the brake band 85 from clamping engagement with the braking surface 48 on the secondary ring gear 47.

If it is desired to go into reverse, the shaft 78 is manually shifted to the left, as viewed from Figure 1. The clutching dog 84 will be disengaged from the clutch teeth 59. The collar 81 on the arm 82 coming to rest against the boss 86. At this time, the mechanism will be in neutral, whereupon, further movement of the shaft 78 in the same direction, that is to say, to the left will be effected against the resistance of the coil spring 87 and will shift the sleeve 88 to clamp the brake band 85 around the secondary ring gear 47 thus arresting its rotation and placing the mechanism in reverse. The sleeve 88 for this purpose is made with a V or wedge shaped undercut slot 89 into which the attaching ears 90 on the brake band 85 extend. The wedge shape of this slot draws the ears 90 together and since the brake band is anchored as at 91, at its diametrically opposite side, the band will thus clamp the braking surface 48 and hold the ring gear against rotation. The shaft 78 may be shifted manually from a location convenient to the driver by a rod 92 which is connected to the shaft 78 by a transverse lever extension 93. When the reversing mechanism is in a position to reverse the transmission and a forward speed is desired, the shaft, as previously explained, is moved to the right, viewed from Figure 1, whereupon the brake band 85 will first be released with sufficient clearance to release the secondary ring gear 47 and further movement of the shaft in the same direction will move the clutching dog 84 into engagement with the carrier 56 and also enlarge the clearance between the brake band 85 and the braking surface 48.

Referring further to the operation of the mechanism, it will be noted that at forward speeds three planetating systems illustrated are connected in driving relation with the driving shaft and that the primary system, only, is directly connected with the driven shaft. The power input is therefore taken into the system on the planet carrier or carriers for the secondary and supplemental systems and the power output is off the ring gear for the primary system. In this connection the planet shafts 52 are mounted in fixed relation to the planet carriers 54 and 56 and the planet gears 51 are journaled on these shafts, whereas the planet shafts 63 are journaled in the planet carriers 54 and 56 but the planet gears 68 are mounted in fixed relation to these shafts; therefore the planetating motion of the planet gears 51, which occurs as a result of the revolution of the planet carriers 54 and 56, drives the sun gear 60 for the reason that there is a constant load, so to speak, on the ring gear 47. Since there is no ring gear in the supplemental system, the planet gears 68 are keyed to the planet shafts 63 and as a result the supplemental sun gear 61 is driven.

The principal object of the assembly is to provide not only a practical power transmission which is especially adaptable for automotive purposes but to also provide an unusually effective automatic control for such a mechanism using a centrifugal speed and torque responsive means such as the weights 66, as an example, and to assemble these weights in a combination, whereby the inherent inertia forces resulting from the operation of the weights will be decreased without decreasing the effective inherent centrifugal force resulting from the operation thereof so that the weights will command a positive control in the mechanism.

Having thus described and shown an embodiment of my invention, what I claim and desire to secure by Letters Patent of the United States is:

1. In an automatic transmission, driving and driven shafts, planetary change speed mechanism connecting said shafts, comprising primary and secondary planetating gear systems, a supplemental planetating gear system, one-way clutching means connecting the supplemental system with the secondary system, centrifugal responsive means in said supplemental system, planet carriers for the supplemental system and the secondary system, means for connecting said carriers with the driving shaft, a combined planet carrier and ring gear for connecting the primary and secondary systems, a ring gear for the primary system, and means for connecting said ring gear in driving relation with the driven shaft.

2. In a transmission, driving and driven shafts, planetary change speed mechanism for connecting said shafts in different speed ratios, comprising primary and secondary planetating gear systems, a planet carrier for connecting the secondary system with the driving shaft, a combined ring gear and planet carrier for connecting the secondary system with the primary system, means for connecting the primary system with the driving shaft, means for automatically changing the speed ratio, and a ring gear for connecting the primary system with the driven shaft.

3. In an automatic transmission, driving and driven shafts, planetary change speed mechanism for connecting said shafts in different speed ratios, comprising primary and secondary planetating gear systems, means for automatically changing the speed ratio, a manually operable clutching means for connecting the secondary system with the driving shaft, a combined planet carrier and ring gear for connecting the secondary system with the primary system, means for connecting the primary system with the driving shaft and a ring gear for connecting the primary system with the driven shaft.

4. In an automatic transmission, driving and driven shafts, planetary change speed mechanism for connecting said shafts in different speed ratios, comprising primary and secondary planetating gear systems, a supplemental gear system, centrifugal responsive weights in said supplemental system, a one-way clutch connecting said supplemental gear system with the said secondary gear system, planet carriers for said supplemental and secondary gear systems, manually operable clutching means for connecting said carriers with the driving shaft, a combined ring gear and planet carrier connecting the primary and secondary gear systems, means operable coincident with said manually operable means for arresting the rotation of said combined ring gear and planet carrier when the drive in the mechanism is reversed, means for connecting the primary system with the driving shaft and means for connecting the primary gear system with the driven shaft.

5. In an automatic transmission, driving and driven shafts, planetary change speed mechanism for connecting said shafts in different speed ratios, comprising primary and secondary planetating gear systems, means for connecting both of said systems in driving relation with the driving shaft, a combined planet carrier and ring gear for inter-connecting said systems, a ring gear for connecting the primary system with the driven shaft and means for automatically changing the speed ratio.

6. In an automatic transmission, driving and driven shafts, planetary change speed mechanism connecting said shafts, comprising primary and secondary gear systems, means for connecting both of said systems to the driving shaft, a combined planet carrier and ring gear connecting said systems, a ring gear for connecting the primary system with the driven shaft, and means for automatically controlling said mechanism.

7. In an automatic transmission, driving and driven shafts, planetary change speed mechanism connecting said shafts, comprising primary and secondary gear systems, means for connecting both of said systems to the driving shaft, a combined planet carrier and ring gear connecting said systems, a ring gear for connecting the primary system with the driven shaft, and means for automatically controlling said mechanism, comprising a plurality of centrifugal devices operatively associated with the secondary system with the effective control developed thereby transmitted to the primary system through said combined planet carrier and ring gear.

8. In an automatic transmission, driving and driven shafts, planetary change speed mechanism for connecting said shafts in different speed ratios comprising primary and secondary gear systems, means for connecting both of said systems to the driving shaft, a combined planet carrier and ring gear connecting said systems, a ring gear for interconnecting the primary system with the driven shaft, a speed responsive control for automatically changing the speed ratio, and means for manually reversing the drive in said mechanism, comprising a clutch for disconnecting the connection between the secondary system and driving shaft and means operable therewith for arresting the rotation of the combined planet carrier and ring gear.

9. In an automatic transmission, driving and driven shafts, planetary change speed mechanism for connecting said shafts in different speed ratios, comprising primary and secondary gear systems, means for connecting both of said systems to the driving shaft, a combined planet carrier and ring gear connecting said systems, a ring gear for interconnecting the primary system with the driven shaft, a speed responsive control for automatically changing the speed ratio, and means for manually reversing the drive in said mechanism comprising a clutch for disconnecting the connection between the secondary system and driving shaft and means operable therewith for arresting the rotation of the combined planet carrier and ring gear, comprising a braking surface on said planet carrier and ring gear, a brake band encircling said surface and means for clamping said braking band around said surface.

10. In an automatic transmission, driving and driven shafts, planetary change speed mechanism for connecting said shafts in different speed ratios comprising a plurality of planetating gear systems, means for connecting said systems in driving relation with the driving shaft, interconnecting means between said systems connecting them in driving relation one with the other at all speeds of the mechanism, means for connecting one of the systems with the driven shaft and means for automatically changing the speed ratio in said mechanism.

11. In an automatic transmission, driving and driven shafts, planetary change speed mechanism for connecting said shafts in different speed ratios, comprising a plurality of planetating gear systems, means for connecting all of the systems with the driving shaft, means for connecting only one system with the driven shaft, a combined ring gear and planet carrier for interconnecting two of said systems and means for automatically changing the speed ratio in said mechanism.

12. In an automatic transmission, driving and driven shafts, planetary change speed mechanism for connecting said shafts in different speed ratios, comprising a plurality of planetating gear systems, means for connecting all of the systems with the driving shaft, means for connecting only one system with the driven shaft, and manually controlled means for reversing the drive in said mechanism, comprising a clutch for disconnecting all but one of the systems with the driving shaft and means for arresting the movement of said disconnected systems and means for automatically changing the speed ratio in said mechanism.

13. In an automatic transmission, driving and driven shafts, planetary change speed mechanism connecting said shafts, comprising a plurality of planetating systems, a permanently fixed drive between one of said systems and the driving and driven shafts, manually operable clutching means for connecting the other of said systems with the driving shaft, a permanently fixed driving connection between two of said systems, and means for automatically controlling the change speed ratio in said mechanism in response to variations in the speed and torque of the driving and driven shafts.

14. In an automatic transmission, driving and driven shafts, planetary change speed mechanism connecting said shafts, comprising a plurality of planetating systems, a permanently fixed drive between one of said systems and the driving and driven shafts, manually operable clutching means for connecting the other of said systems with the driving shaft, a permanently fixed driving connection between two of said systems, and means for automatically controlling the change speed ratio in said mechanism in response to variations in the speed and torque of the driving and driven shafts, comprising centrifugal responsive devices operatively associated with one of the systems and with the control established thereby transmitted to the other of said systems through the means interconnecting the systems.

In testimony whereof I have hereunto subscribed my name.

KENNETH E. LYMAN.